United States Patent [19]

Degeilh et al.

[11] Patent Number: 5,187,217

[45] Date of Patent: Feb. 16, 1993

[54] PROCESS FOR THE PRODUCTION OF A PLASTICIZED POLYVINYL BUTYRAL FOR GLUING A BASE ONTO A GLAZING

[75] Inventors: Robert Degeilh, Le Port Marly; Daniel Dages, Les Mureaux, both of France

[73] Assignee: Saint-Gobain Vitrage, Courbevoie, France

[21] Appl. No.: 734,104

[22] Filed: Jul. 24, 1991

Related U.S. Application Data

[63] Continuation of Ser. No. 176,751, Apr. 1, 1988, abandoned.

[30] Foreign Application Priority Data

Apr. 2, 1987 [FR] France ................ 87 04620

[51] Int. Cl.⁵ .............................................. C08L 0/00
[52] U.S. Cl. .................................... 524/297; 524/299; 524/742; 524/747; 525/61
[58] Field of Search ............... 525/61; 524/297, 299, 524/742, 747

[56] References Cited

U.S. PATENT DOCUMENTS

| | | | |
|---|---|---|---|
| 2,345,946 | 4/1944 | Overbaugh | 525/61 |
| 3,153,009 | 10/1964 | Rombach | 525/61 |
| 4,533,697 | 8/1985 | Degeilh | 525/61 |

FOREIGN PATENT DOCUMENTS

| | | |
|---|---|---|
| 0130872 | 1/1985 | European Pat. Off. . |
| 2007677 | 5/1979 | United Kingdom . |

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Process for the production of a plasticized polyvinyl butyral particularly used for gluing a base onto glazings. The polyvinyl butyral is obtained by the reaction of a butyric aldehyde with a polyvinyl alcohol, demonstrating a level of hydrolysis greater than 95%, and a viscosity greater than 50 cP, in the presence of an acid catalyst and an emulsifier, the quantity of butyric aldehyde being such that the level of hydroxylation of the polyvinyl butyral obtained is between 22 and 26%.

7 Claims, No Drawings

PROCESS FOR THE PRODUCTION OF A PLASTICIZED POLYVINYL BUTYRAL FOR GLUING A BASE ONTO A GLAZING

This application is a continuation of application Ser. No. 07/176,751 filed on Apr. 1, 1988, now abandoned.

BACKGROUND OF THE INVENTION

1. Field of the Invention

The invention concerns a process for the production of a plasticized polyvinyl butyral particularly used for gluing a base onto glazing, especially a base intended to attach an interior rearview mirror to a windshield.

2. Background of the Prior Art

Polyvinyl butyral (PVB) which is plasticized using adequate plasticizers is known to be used in the form of films, as an intermediate layer in laminated glazings. It is also used for gluing articles to sheets of glass, particularly bases for rear-view mirrors. This latter application requires different properties from those properties required for the application of PVB as an intermediate layer between two sheets of glass. In particular, plasticized PVB for gluing bases must have great rigidity, resistance to high temperatures, that is approximately 80° C., very good adhesion in view of the forces to which the base can be subjected during adjustment of the rear-view mirror of a vehicle, which occurs under extremely varied temperature conditions.

Known polyvinyl butyrals used for this application are not entirely satisfactory; in particular, the adhesion can be poor or insufficient at high temperatures.

SUMMARY OF THE INVENTION

The invention proposes a new plasticized polyvinyl butyral which presents the properties required for use as a material for gluing bases onto glazing, especially bases for interior rear-view mirrors for transport vehicles.

In accordance with the invention, the polyvinyl butyral is obtained by the reaction of a polyvinyl alcohol, demonstrating a high level of hydrolysis, greater than 95%, and preferably on the order of 98%, and a high viscosity, greater than 50 cP according to the DIN 53015 standard, with a quantity of aldehyde such that the level of hydroxylation of the polyvinyl butyral obtained is between 22 and 26%, preferably between 23 and 25%, with the reaction taking place in the presence of an acid catalyst and an emulsifier, preferably chosen from among sodium dioctyl sulfosuccinate and an ethoxylated alkylphenol sulfate with the formula:

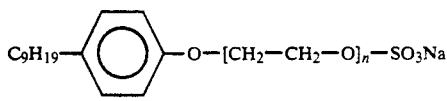

with n=6 or 7.

According to one characteristic of the invention, the process uses the operations described in the publication of French Patent 2 547 589. The PVB resin is advantageously obtained in the following manner: An acid catalyst and an emulsifier are incorporated in an aqueous solution comprising 8 to 15% by weight polyvinyl alcohol hydrolyzed to approximately 98% and having a viscosity greater than 50 cP, preferably between 50 and 60 cP (according to the DIN 53015 standard), butyric aldehyde is introduced to the mixture obtained, which is kept between 5° and 12° C., while agitating, in a quantity such that it corresponds to obtaining a PVB with 22 to 26% and preferably 23 to 25% hydroxylation, the introduction being carried out progressively over a period such that the PVB precipitates between 10 and 90 minutes after the start of this introduction, the mixture is kept agitated for a period greater than 30 minutes, at a temperature of 8° to 15° C., then the temperature is raised to a value between 60° and 80° C. over a lapse of time between one and a half to four hours, a base is incorporated into the mixture to obtain a pH of about 7, the temperature is maintained for a period equal to or greater than 5 minutes, the PVB precipitated is separated from the mixture and washed.

The plasticizer is added to the PVB resin obtained. The quantity of plasticizer is determined according to a characteristic of the invention, in a ratio of 20 to 25 parts of plasticizer to 100 parts of resin.

Suitable plasticizers are those described, for example, in the publications of the European Patents 0 011 577 and 0 047 215; these are particularly octyl adipate and benzyl adipate, and a mixture of octyl adipate and benzyl adipate with n-hexyl adipate.

The mixture of the resin and the plasticizer is extruded in the form of strings with a thickness of about 0.3 to 1 mm.

The strings, cut to the desired dimensions, are used to glue bases onto glazing, these bases generally being metal bases, for example made of steel, nickel, aluminum, a metal alloy, etc.

DETAILED DESCRIPTION OF THE INVENTION

Other characteristics and advantages of the invention will become evident in the following description of production examples.

EXAMPLE 1

An aqueous solution based on 30 kg polyvinyl alcohol (PVA) and water is prepared to yield a 10% solution of PVA. The PVA is hydrolyzed to 98%, its molecular weight is approximately 220,000 and its viscosity is approximately 56 cP. The PVA solution is cooled to 10° C. and 2.65 kg hydrochloric acid with a density of 1.18 is added as a catalyst, and 590 g sodium dioctyl sulfosuccinate is added as an emulsifier. Over a period of 30 minutes, 16.0 kg butyric aldehyde is added, in such a way as to obtain a level of hydroxylation of 25% for the PVB.

The reaction is allowed to continue for 30 minutes at about 15° C. The suspension is progressively heated to 70° C., the time for raising the temperature is about 2 hours. The mixture is kept reactive at this temperature for 30 minutes, and the mixture is neutralized with the quantity of soda necessary to obtain a pH of 7. The product is washed several times with water at 70° C., drained and dried.

The resin obtained is plasticized in a high-speed mixer with a mixture of octyl adipate and benzyl adipate (65% by weight) and n-hexyl adipate (35% by weight). The quantity of plasticizer relative to the resin is 23 parts per hundred. The mixture is extruded in strings with a length of 5 cm and a thickness of 0.5 mm.

Samples are cut, adhered onto metal bases, and adhered onto glass only by pressure, at 80° C. for 8 seconds. The assembly obtained in this way is subjected to the various tests described below.

Hot Flow

The test is carried out on five glued bases. A load of 500 g suspended on a lever arm of 5 cm is applied to each one at a temperature of 90° C. for 72 hours. In order for the test to be positive, none of the bases must come loose.

Separation Test

Normal Separation

A load of 500 kg is applied to the gluded base at a speed of 10 mm/min. The base must resist a force greater than 50 daN.

Damp separation

This is carried out in the same manner as above, but after having subjected the glued bases to a humidity cycle of 72 hours at 60° C. and 100% humidity. The base must resist a force greater than 50 daN.

Torsion Test

The base is subjected to torsion using a dynamometric key.
a) The glue area must resist torsion torque of at least 3 kgm.
b) The glue area must resist torsion torque of 2 kgm for 30 seconds.

The tests to which the samples obtained according to Example 1 were subjected yielded the following results:

| hot flow test: | good |
|---|---|
| separation at 20° C.: | 80.8 daN |
| damp separation: | 93.4 daN |
| torsion test a): | 4.8 kgm |
| torsion test b): | good |

EXAMPLE 2

Work is carried out under the same conditions as in Example 1, except that the quantity of butyric aldehyde is reduced to 15.5 kg in order to obtain a PVB with a level of hydroxylation of 25%.

The results of the tests are the following:

| hot flow test: | good |
|---|---|
| separation at 20° C.: | 75.8 daN |
| damp separation: | 90.1 daN |
| torsion test a): | 4.2 kgm |
| torsion test b): | good |

EXAMPLE 3

Before mixing the resin obtained according to Example 1 with the same plasticizer in the same proportions, bone black is incorporated in this plasticizer in a ratio of 1.7 parts bone black to 100 parts resin.

The results of the tests are the following:

| hot flow test: | good |
|---|---|
| separation at 20° C.: | 68.6 daN |
| damp separation: | 76.5 daN |
| torsion test a): | 3.6 kgm |
| torsion test b): | good |

The bone black which produces a black coloration in the plasticized PVB while not changing its essential characteristics.

EXAMPLE 4

Work is carried out under the same conditions as in Example 1, except that the sodium dioctyl sulfosuccinate is replaced with ethoxylated alkylphenol sulfate, the formula of which was already cited above.

The results of the tests are the following:

| hot flow test: | good |
|---|---|
| separation at 20° C.: | 75.2 daN |
| damp separation: | 72.1 daN |
| torsion test a): | 4.8 kgm |
| torsion test b): | good |

COMPARISON EXAMPLE 1

Work is carried out under the same conditions as in Example 1, except that the PVA which is hydroxylated at 98%, has a viscosity of 28 cP.

| hot flow test: | poor |
|---|---|
| separation at 20° C.: | 21.4 daN |
| damp separation: | 36.2 daN |
| torsion test a): | 1.1 kgm |
| torsion test b): | poor |

Use of a PVA with a conventional viscosity does not result in the characteristics desired for application as a glue for bases of rear-view mirrors.

COMPARISON EXAMPLE 2

Work is carried our under the same conditions as in Example 1, except that the quantity of butyric aldehyde used in the reaction is such that the level of hydroxylation of the PVB obtained is 20%.

| hot flow test: | good |
|---|---|
| separation at 20° C.: | 71.2 daN |
| damp separation: | 90.6 daN |
| torsion test a): | 2.0 kgm |
| torsion test b): | poor |

The use of a quantity of butyric aldehyde necessary to obtain a PVB with a level of hydroxylation below 22% does not result in the characteristics desired for the application.

When the quantity of butyric aldehyde used corresponds to a level of hydroxylation for the PVB which is greater than 26%, the final product obtained is too rigid, it is difficult to use and, in particular, the glue connection is not satisfactory.

Obviously, numerous modifications and variations of the present invention are possible in light of the above teachings. It is therefore to be understood that within the scope of the appended claims, the invention may be practiced otherwise than as specifically described herein.

What is claimed as new and desired to be received by Letters Patent of the United States is:

1. A process for the production of a polyvinyl butyral particularly useful for gluing a base onto glazing, comprising reacting butyric aldehyde with polyvinyl alcohol, with the polyvinyl alcohol demonstrating a level of hydrolysis of at least 98%, in the presence of an acid catalyst and an emulsifier, wherein the viscosity of the polyvinyl alcohol is at least 50 cP, and the quantity of butyric aldehyde is such that the level of hydroxylation of the polyvinyl butyral obtained is 23 to 25%.

2. A process according to claim 1, wherein the emulsifier is chosen from among sodium dioctyl sulfosuccinate and an ethoxylated alkylphenol sulfate with the formula:

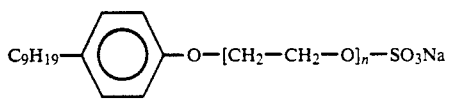

with n=6 or 7.

3. A process according to claim 1, wherein polyvinyl butyral resin is mixed with a plasticizer in a ratio of 20 to 25 parts of plasticizer to 100 parts of resin.

4. A process according to claim 1, further comprising mixing the polyvinyl butyral with a plasticizer selected from the group consisting of octyl adipate, benzyl adipate and mixtures thereof.

5. A process according to claim 3, wherein the plasticizer is a mixture of octyl adipate and benzyl adipate with n-hexyl adipate.

6. A process according to claim 3, wherein the plasticizer further comprises bone black.

7. A process according to claim 1, wherein the acid catalyst and emulsifier are incorporated in an aqueous solution comprising 8 to 15% by weight polyvinyl alcohol hydrolyzed to at least 98% and having a viscosity between 50 cP and 60 cP, butyric aldehyde is introduced to the mixture obtained, which is kept between 5° and 12° C., the introduction being carried out progressively over a period such that the PVB precipitates between 10 to 90 minutes after the start of this introduction, the quantity of butyric aldehyde introduced corresponding to obtaining a PVB with 23 to 25% hydroxylation, the mixture is kept agitated for a period greater than 30 minutes, at a temperature of 8° to 15° C., the temperature is then raised to a value between 60° and 80° C. over a time period between one and a half hours and four hours, a base is then incorporated into the mixture to obtain a pH of about 7, the temperature is maintained for a period equal to or greater than 5 minutes, the PVB precipitated is separated from the mixture and washed.

* * * * *